United States Patent
Jung et al.

[11] Patent Number: 5,728,181
[45] Date of Patent: Mar. 17, 1998

[54] ELECTRODES FOR ELECTROCHEMICAL CELLS AND METHOD OF MAKING SAME

[75] Inventors: Richard H. Jung, Park Ridge; Ke Keryn Lian, Northbrook; Changming Li, Vernon Hills; Han Wu, Barrington, all of Ill.

[73] Assignee: Motorola, Inc., Schaumburg, Ill.

[21] Appl. No.: 743,610

[22] Filed: Nov. 4, 1996

[51] Int. Cl.$^6$ ............................................. H01M 10/38
[52] U.S. Cl. ..................... 29/623.5; 29/623.1; 429/127; 429/162; 429/215; 429/245
[58] Field of Search .................................. 429/127, 162, 429/215, 245, 212; 29/623.1, 623.5

[56] References Cited

U.S. PATENT DOCUMENTS 5,350,647  9/1994  Hope et al. ............................. 429/218

*Primary Examiner*—M. Nuzzolillo
*Attorney, Agent, or Firm*—Kenneth M. Massaroni; Kelly A. Gardner

[57] ABSTRACT

An electrochemical cell is provided with a first and second electrode assemblies (10) (11), and an electrolyte (15) disposed therebetween. The electrodes may either be of the same or different materials and may be fabricated from ruthenium, iridium, cobalt, tungsten, vanadium, iron, molybdenum, nickel, silver, zinc, and combinations thereof. The electrode assemblies are fabricated by depositing a layer (16) of a conductive ink adhesive on a surface of a current collecting substrate (12). Thereafter, a layer of powdered active material (18) is impregnated onto the surface of the conductive ink layer.

20 Claims, 3 Drawing Sheets

ELECTRODES FOR ELECTROCHEMICAL CELLS AND METHOD OF MAKING SAME

TECHNICAL FIELD

This invention relates in general to electrochemical cells, and more particularly to electrochemical cells, such as electrochemical batteries or capacitors, having electrode active materials bonded to current collecting substrates.

BACKGROUND OF THE INVENTION

Energy generation and storage has long been a subject of study and development. Of special importance is the storage of electrical energy in a compact form that can be readily charged and discharged such as rechargeable electrochemical batteries and/or electrochemical capacitors. High power, high current pulse rechargeable electrochemical charge storage devices are also becoming increasing important in applications in which electrical pulses are required. Examples of such devices include digital communication devices, power tools, and portable computers to name but a few. In each of these devices, high electrochemical kinetic rate, long cycle life of the electrode material and good ionic conductivity of the electrolyte are all extremely important considerations.

Most electrochemical battery devices are fabricated to include at least two electrodes—the anode and the cathode—separated by an electrically insulating, ionically conducting separator medium. Charge transfer from one electrode to the other is accomplished via an electrolyte, typically a liquid electrolyte. Much recent development activity has been directed to the use of polymeric matrices as both the separator, and to hold the electrolyte in a gelled form, thus proving a dry or solid state device.

Fabrication of high surface area electrodes is commonly accomplished via bonding of powdered active electrode material with a binding medium, onto the surface of a current collecting substrate, such as a thin metallic film or foil. High surface area electrodes are desired as the high surface area provides more active sites for electrochemical reactions, and hence higher kinetic rate capability. The active material coated substrate is typically sintered in order to increase the mechanical strength of the electrode.

Although this process has met with considerable commercial success in older electrochemical systems, such as nickel-cadmium batteries, it is has many limitation which make it inappropriate for many newer technologies. For example, the sintering process is not applicable to high-melting temperature or sublimable materials such as the activated carbons used in may electrochemical systems. The content of the binding medium or binder is critical: Too much binder reduces the active surface area, unacceptably degrading the electrochemical performance of the active material electrode, while too little does not provide sufficient binding strength, resulting in electrode mechanical failure. Also, the binder, often a polymeric material, when mixed with the active material, yields a viscous solution which is difficult to coat into thin layers of less than about 25 μm. Some binders, notably commonly used Teflon, make wetting the surface of the electrode with the aqueous electrolyte difficult due to the fact that it is hydrophobic. This results in lower electrode utilization, and decreased electrode performance. Finally, equivalent series resistance ("ESR") reduces energy efficiency. Binders increase ESR, and hence reduces electrode performance. ESR can be reduced, but at the cost of adding conductive carbon powder to the electrode active material in order to increase electrical conductivity.

Accordingly, there exists a need to provide novel electrochemical devices free of limitations inherent in the prior art. Such a device should be characterized by electrodes which have low ESR, and an optimal combination and segregation of active material an binder. Moreover, fabrication of such an electrode should be simple, inexpensive and readily repeatable.

DETAILED DESCRIPTION OF THE PREFERRED EMBODIMENT

Figure 1:
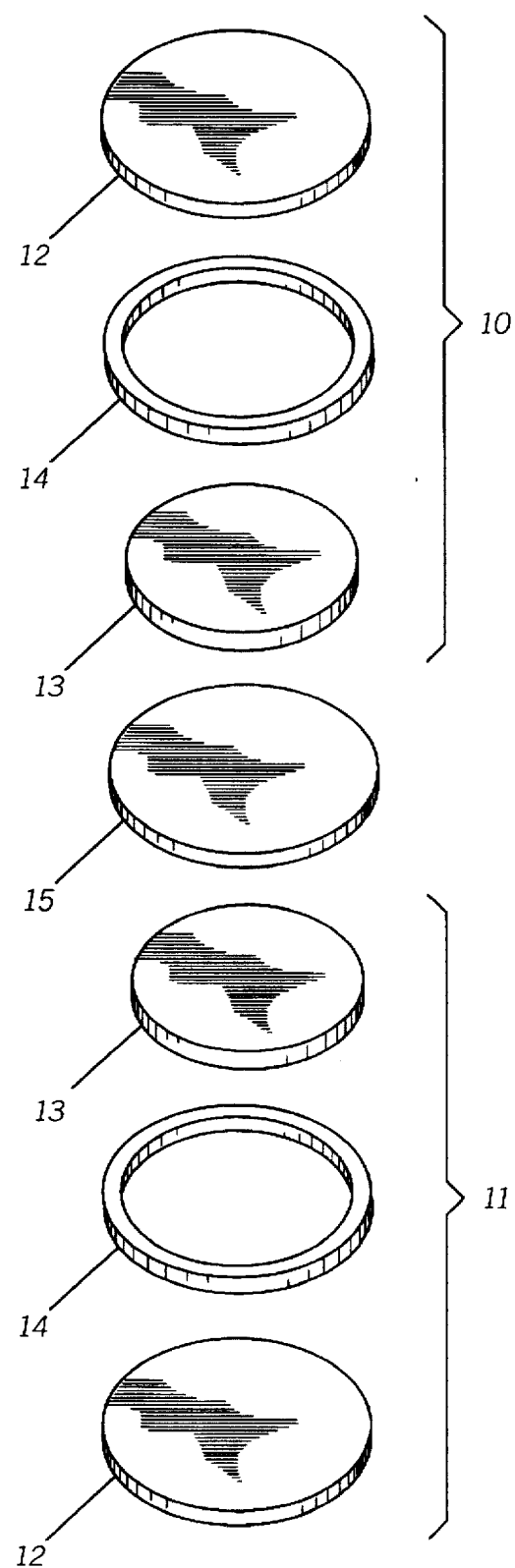
FIG. 1 is a schematic representation of an electrochemical charge storage device in accordance with the invention.

While the specification concludes with claims defining the features of the invention that are regarded as novel, it is believed that the invention will be better understood from a consideration of the following description in conjunction with the drawing figures, in which like reference numerals are carried forward.

Referring now to FIG. 1, there is illustrated therein an energy storage device such as an electrochemical charge storage device fabricated from a pair of electrode assemblies 10 and 11, which may be the anode and the cathode of the device. The electrochemical charge storage device may be either an electrochemical capacitor or an electrochemical battery cell. The electrochemical capacitor is preferably an electrochemical capacitor characterized by either a double layer or an oxidation/reduction charge storage mechanism. Each electrode assembly 10 and 11 includes an electrode 13 which electrodes may either be fabricated from the same or different materials. In the instance in which the electrodes are fabricated of the same material, they are referred to as "symmetric electrodes". Conversely, if they are made from different materials, they are referred to as "asymmetric electrodes". Regardless of whether or not the electrodes are asymmetric or symmetric, they are each made from one or more materials selected from the group consisting of carbon, ruthenium, iridium, platinum, cobalt, tungsten, vanadium, iron, nickel, molybdenum, silver, zinc, lead, manganese, alloys thereof, nitrides thereof, carbides thereof, sulfides thereof, oxides thereof, phosphides thereof, and combinations thereof. Alternatively, said electrodes may be fabricated of conducting polymers.

Each electrode assembly may further include a current collector 12 which is electrically conducting. The current collector 12 is preferably chemically inert in the polymer electrolyte 15 described hereinbelow. A housing or gasket 14 may be employed to house the electrode and the electrolyte, but is optional. The electrolyte 15 is sandwiched between the electrodes and is in the form of a film, such as a polymer, which may also serve as a separator between the two electrodes. This structure thus affords free and unobstructed movement to the ions in the electrolyte. The combination electrolyte/separator prevents contact between the opposing electrodes since such a condition would result in a short circuit and malfunction of the electrochemical cell.

In one embodiment of the instant invention, the electrolyte is a polymer electrolyte which is disposed between and in contact with both the electrode assemblies. The polymer electrolyte comprises a polymer support structure or matrix which has an electrolyte active species disposed or dispersed therein. The polymeric support structure or matrix preferably is fabricated of a polybenzimidazole (PBI) or poly (vinyl alcohol) (PVA). Dispersed within the polymer support structure is an electrolyte active species. In one preferred embodiment, the electrolyte active species is a proton conducting electrolyte species. The proton conducting electrolyte active species may be selected from the group of materials consisting of $H_3PO_4$ (phosphoric acid), $H_2SO_4$ (sulfuric acid), HCl (hydrochloric acid), $HNO_3$, and combinations thereof. Alternatively, the electrolyte active species may be a metal hydroxide such as KOH, NaOH, LiOH, CeOH, and combinations thereof. In another embodiment, the polymer electrolyte is made from poly{2,2'-m-(phenylene)-5,5'-bibenzimidazole} and phosphoric acid. While the invention is described above as having a polymeric/proton conducting electrolyte, the invention is not so limited. The electrolyte may be a solid, liquid, gel, or some combination thereof.

Referring now to FIGS. 2 and 3-6, there is illustrated therein a schematic representation of a single electrode assembly, such as electrode assembly 10 of FIG. 1, and the steps for fabricating the same. The electrode assembly 10 includes a current collecting substrate 12 as illustrated in FIG. 1. The electrode substrate is preferably fabricated of an electrically conducting, current collecting material such as copper, nickel, silver, aluminum, zinc, stainless steel, titanium, alloys thereof, and combinations thereof. The current collecting substrate may alternatively be fabricated of a nonconductive material having a layer of a conducting material disposed thereover. The current collecting substrate may be fabricated as a foil, a thin film, a metal foil laminated to flexible polymer film mesh or some combination thereof. In one preferred embodiment, the current collecting substrate is fabricated of a copper foil or aluminum foil.

Figure 2:
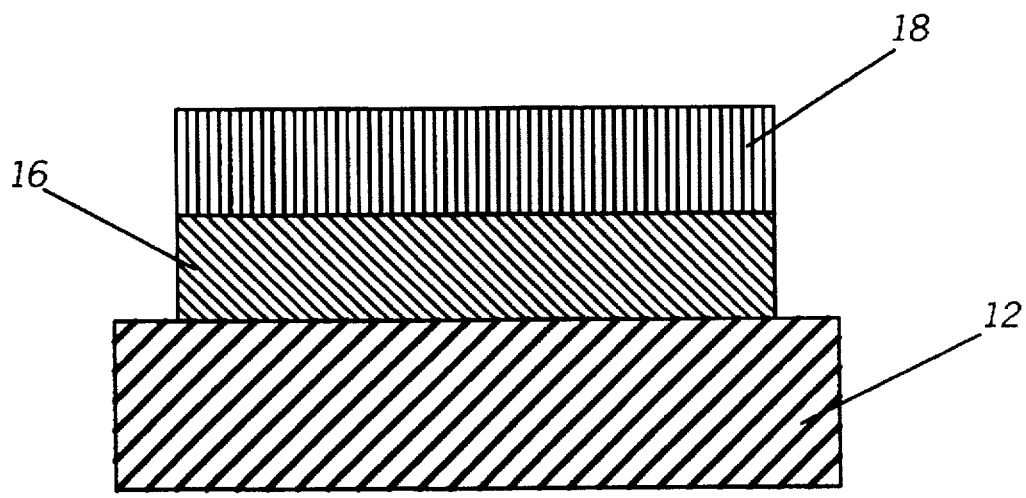
FIG. 2 is a schematic representation of an electrode structure, in accordance with the invention.
Figure 3:
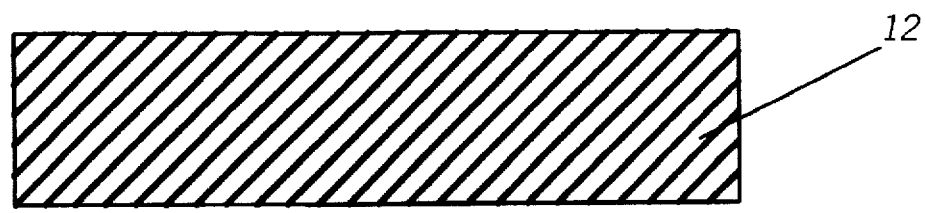
FIGS. 3–6 are a series of schematic representations of the steps for fabricating an electrode, in accordance with the invention.
Figure 4:
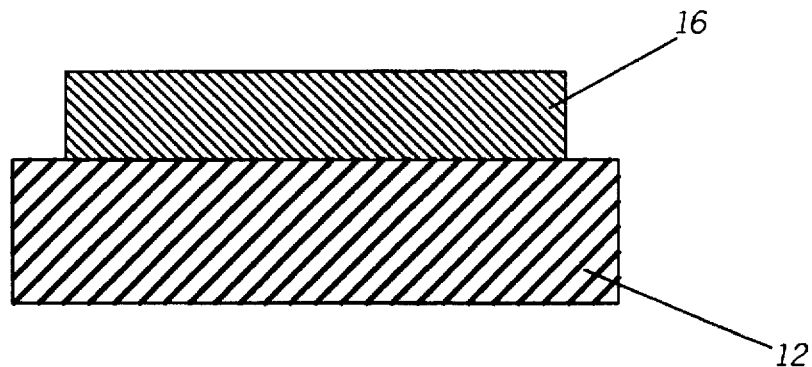

Referring now to FIGS. 2 and 4, deposited on one side of the substrate 12 is a layer of an electrically conductive ink 16, such as a carbon ink. The conductive ink comprises a liquidic transference medium, which has dispersed therein an electrically conducting medium. The transference medium also insulates the substrate 12 from exposure to any corrosive effects of the electrolyte active species. The transference medium is also an adhesive which binds a subsequently deposited electrode active material to the current collecting substrate. In a preferred embodiment, the transference medium is selected from the group of materials consisting of epoxy, polythiophene, acrylate, phenolformaldehyde, polyamide, and combinations thereof. The conducting medium dispersed therein is preferably a carbon material, such as acetylene black, furnace black, ferrophosphide, metal oxides, metal carbides, metal nitrides, metal sulfides, and combinations thereof. The carbon is preferably in the form of a powder having a preferred particle size in the range of between about 0.5 and 3 µm, and preferably about 2 µm. The loading of the conductive medium in the transference medium, i.e., the amount of the conductive medium dispersed in the transference medium is on the order of between 1 and 50 mg/cm$^2$. The conductive ink is typically deposited to a thickness of between 10 and 100 µm, and preferably between about 15 and 40 µm.

Figure 5:
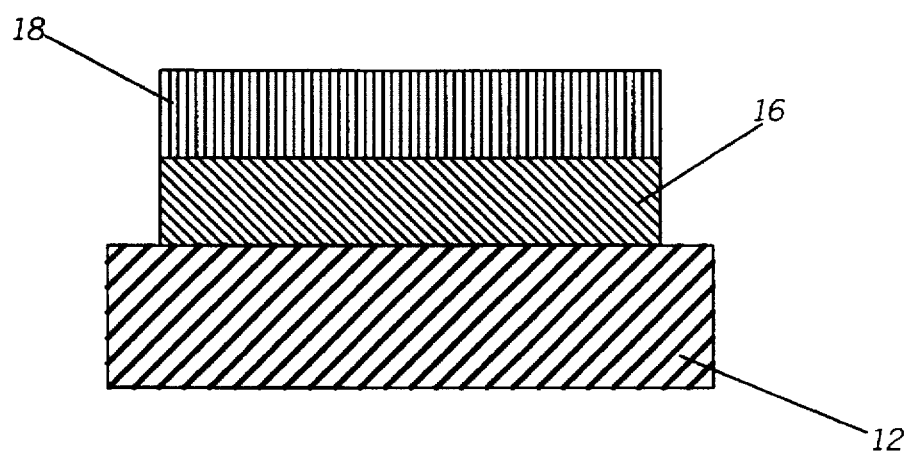

Referring now to FIGS. 2 and 5, there is illustrated the step of depositing a layer of an active material 18 atop the layer of conductive ink 16. An advantage of the ink process described above is that it is conducive to a screen printing process or other process that controls the amount and location of the ink. Likewise, the process allows for the selective coating of the active materials on the inks so as to manage the size and shape of the electrode assemblies. The active material is preferably fabricated as a powder of one or more of the electrode active materials described hereinabove. The powder form is preferred since as it is impregnated into the ink, it provides the high degree of surface area required to give high kinetic rate. Moreover, as the adhesive layer is completely coated with the active materials, there is no loss of performance due to the presence of binder material at the electrode/electrolyte interface. In one preferred embodiment, the electrode active material is fabricated of ruthenia or a ruthenium oxide powder. The powder particle size is in the range of between about 1 and 7 µm and preferably in the range of between about 1 and 4 µm. The layer of electrode active material is typically deposited to a thickness of between 10 and 100 µm and preferably in the range of between about 20 and 30 µm.

Figure 6:
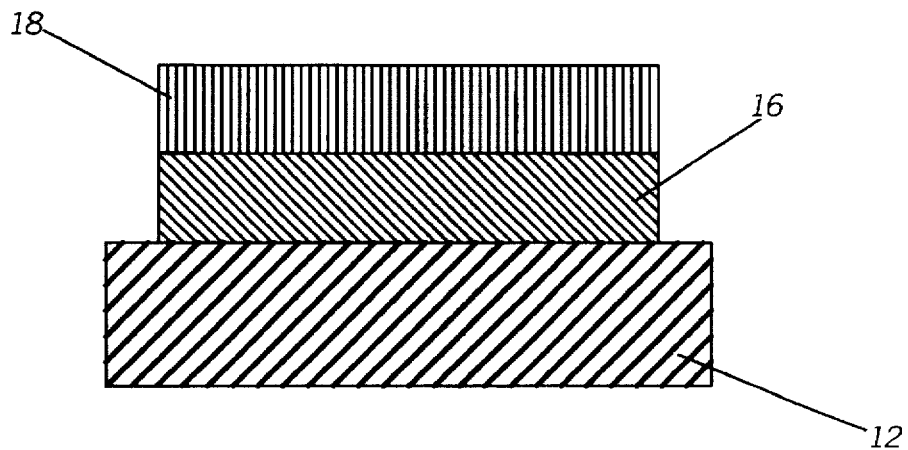

Thereafter, and referring now to FIG. 6, the entire structure is cured, as by heating, drying, or exposure to radiation. The primary function of the curing step illustrated in FIG. 6 is to cross-link the binder, and to drive off the liquid component of the conductive ink. This curing step solidifies the adhesive properties of the conductive ink, bonding the active material powder to the substrate. Curing is preferably carried out by heating the electrode assembly to a temperature of between 230° and 300° C. for a period of time of between 1 and 120 minutes. Thereafter, the electrode assembly is ready to be incorporated into an electrochemical device such as that illustrated in FIG. 1.

It is to be noted that the electrode assembly illustrated in FIGS. 2 and 3-6 is not limited to the exact structure illustrated therein. A bipolar electrode assembly may be easily fabricated by simply employing the same steps on the opposing major surface of the current collecting substrate. Other similar substitutions and modifications will be apparent to one of ordinary skill in the art.

A series of different capacitor devices were fabricated in accordance with the processes described hereinabove. The performance characteristics are summarized in the following table:

TABLE I

Electrical Performance on Copper Foil Current Collector

| Carbon Double Layer Capacitor Electrodes | Capacitance (mF/cm$^2$) at Sweep Rate of 100 mV/sec |
| --- | --- |
| EMCA P3503 Carbon Ink | 0.6 |
| Carbon Ink + Asbury UF440 carbon powder | 10 |
| Carbon Ink + Osaka M20 Carbon Powder | 110 |
| Minico M1001RS Carbon Silver Ink + M20 Carbon Powder | 170 |
| Carbon Ink + M20 Carbon Powder Plasma etched | 1300 |
| Carbon Ink + Westvaco Carbon Powder | 130 |

| Redox Capacitor Electrodes | Capacitance (mF/cm$^3$) at Sweep Rate of 100 mV/sec |
| --- | --- |
| Carbon ink + Aldrich Ru on C powder | 110 |
| Carbon ink + Degussa RuO$_2$ powder | 900 |

| Capacitor Electrodes | Capacity (mC/cm$^2$) at Sweep Rate of 50- mV/sec |
| --- | --- |
| Carbon Ink + Sb-Bi powder | 400 |
| Carbon Ink + UF 440 Carbon Powder Sb-Bi | 1080 |

TABLE I-continued powder

| One Cell Devices | Capacitance (mF/cm$^2$) |
|---|---|
| Ru/5M H$_2$SO$_4$/Ru (100 mV/sec sweep rate) | 420 |
| Ru/PVA-H$_3$PO$_4$/Ru (200 mV/sec sweep rate) | 340 |

| Active Material | Average Surface Area (m$^2$/gm) |
|---|---|
| UF440 Carbon Powder | 50–80 |
| M20 Carbon Powder | 2000 |
| Westvaco Carbon Powder | 1000 |
| Degussa RuO$_2$ | 50 |
| Thickness of powder over ink: 25–50 micron | |

While the preferred embodiments of the invention have been illustrated and described, it will be clear that the invention is not so limited. Numerous modifications, changes, variations, substitutions and equivalents will occur to those skilled in the art without departing from the spirit and scope of the present invention as defined by the appended claims.

What is claimed is:

1. An electrode for an electrochemical energy storage device comprising:

a current collecting substrate;

a layer of a conductive ink disposed on at least one major surface of said current collecting substrate, said conductive ink including a transference medium and a conducting medium; and a layer of powdered electrode active material impregnated into the layer of conductive ink.

2. An electrode as in claim 1, wherein said current collecting substrate is fabricated of a material selected from the group of copper, nickel, silver, stainless steel, tin, lead, aluminum, and combinations thereof.

3. An electrode as in claim 1, wherein said transference medium is an adhesive conductive transference medium.

4. An electrode as in claim 1, wherein said transference medium is selected from the group of materials consisting of epoxy, polythiophene acrylate, phenol-formaldehyde, polyamides, and combinations thereof.

5. An electrode as in claim 1, wherein said conducting medium is loaded in said transference medium on the order of between 1 and 50 mg/cm$^2$.

6. An electrode as in claim 1, wherein said conducting medium is selected from the group of materials consisting of acetylene black, furnace black, ferrophosphide, metal carbides, metal oxides, metal sulfides, metal nitrides, and combinations thereof.

7. An electrode as in claim 1, wherein the electrode active material is selected from the group consisting of ruthenium, iridium, carbon platinum, cobalt, tungsten, vanadium, iron, nickel, molybdenum, silver, zinc, lead, manganese, alloys thereof, nitrides thereof, carbides thereof, sulfides thereof, oxides thereof, hydroxides thereof and combinations thereof.

8. An electrode as in claim 1, wherein the particle size of said powdered active material is between 1 and 100 µm.

9. An electrode as in claim 1, wherein said conductive ink layer is deposited on said substrate to a thickness of between 10 and 100 µm.

10. An electrode as in claim 1, wherein said conductive ink layer is deposited to a thickness of preferably between about 15 and 40 µm.

11. A method of fabricating an electrode for an electrochemical cell, said method comprising the steps of:

providing a current collecting substrate;

depositing a layer of a conductive ink on said current collecting substrate, said conductive ink including a transference medium and a conducting medium; and impregnating said layer of conductive ink with a powdered electrode active material.

12. A method as in claim 10, wherein said current collecting substrate is fabricated of a material selected from the group of copper, nickel, silver, stainless steel, aluminum, lead, and combinations thereof.

13. A method as in claim 10, wherein said transference medium is an adhesive transference medium.

14. A method as in claim 10, wherein said transference medium is selected from the group of materials consisting of epoxy, polythiophene acrylate, phenol-formaldehyde, polyamides, and combinations thereof.

15. A method as in claim 10, wherein said conducting medium comprises between 1 and 50 mg/cm$^2$ weight percent of the conductive ink.

16. A method as in claim 10, wherein said conducting medium is selected from the group of materials consisting of acetylene black, furnace black, ferrophosphide, metal carbides, metal oxides, metal sulfides, metal nitrides, and combinations thereof.

17. A method as in claim 10, wherein the electrode active material is selected from the group consisting of ruthenium, iridium, platinum, cobalt, tungsten, vanadium, iron, nickel, molybdenum, silver, zinc, lead, manganese, alloys thereof, nitrides thereof, carbides thereof, sulfides thereof, oxides thereof, hydroxides thereof, and combinations thereof.

18. A method as in claim 10, wherein the particle size of said powdered active material is between 1 and 100 µm.

19. A method as in claim 10, wherein said conductive ink layer is deposited on said substrate to a thickness of between thickness of between 10 and 100 µm.

20. A method as in claim 10, wherein said conductive ink layer is deposited to a thickness of preferably between about 15 and 40 µm.

* * * * *